No. 788,255. Patented April 25, 1905.

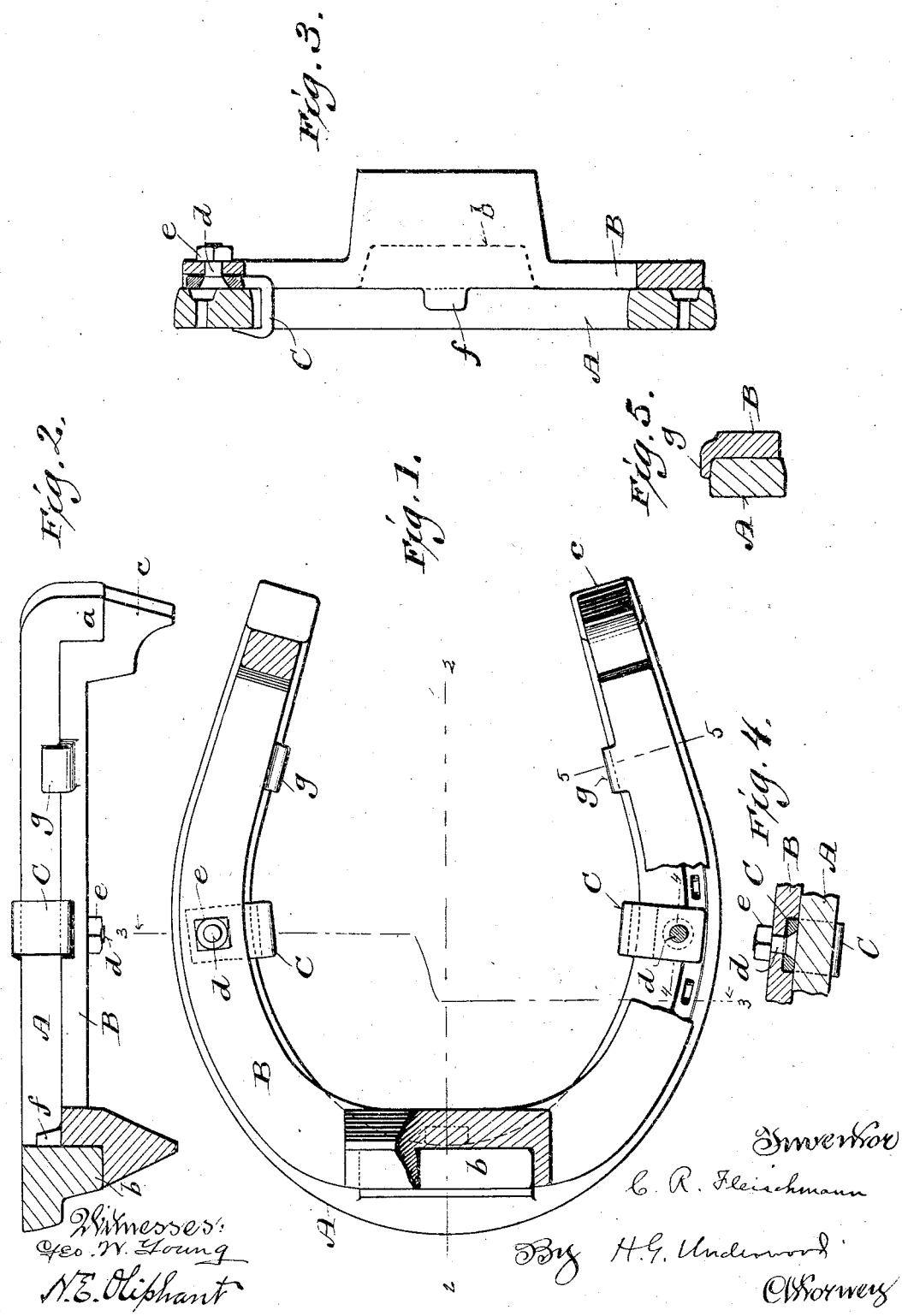

UNITED STATES PATENT OFFICE.

CHARLES R. FLEISCHMANN, OF CHICAGO, ILLINOIS.

HORSESHOE ATTACHMENT.

SPECIFICATION forming part of Letters Patent No. 788,255, dated April 25, 1905.

Application filed July 24, 1903. Serial No. 166,802.

*To all whom it may concern:*

Be it known that I, CHARLES R. FLEISCHMANN, a citizen of the United States, and a resident of Chicago, in the county of Cook and State of Illinois, have invented certain new and useful Improvements in Horseshoe Attachments; and I do hereby declare that the following is a full, clear, and exact description thereof.

My invention has for its object to provide simple economical calk attachments for ready application to shoes on horses or removal therefrom by others than skilled workmen and without the aid of special tools, said invention consisting in what is hereinafter particularly set forth with reference to the accompanying drawings and subsequently claimed.

Figure 1 of the drawings represents a plan view of an inverted horseshoe provided with a calk attachment in accordance with my invention, parts of the attachment being broken away and in section; Fig. 2, a partly-sectional elevation of the shoe and attachment, this view being indicated by line 2 2 in the first figure; and Figs. 3, 4, and 5, sectional views respectively indicated by lines 3 3, 4 4, and 5 5 in said first figure.

Referring by letter to the drawings, A indicates an ordinary horseshoe having blunt toe and heel calks integral therewith. Designed to match the lower face of the horseshoe is a band B, having depending sharp toe and heel calks rigid therewith. The toe of the calk-band is recessed to clear the toe-calk *b* of the horseshoe, and the heel-calks *c* of said band are angularly notched to lap the heel-calks of said horseshoe. Clips C are employed in engagement with the quarters of the horseshoe and are set in place from the inside of said shoe. The upper face of the quarters of the calk-band are recessed to fit the clips, and bolts *d* extend through apertures in said clips and calk-band, the heads of the bolts being countersunk. It is practical to make the bolt integral with the clip, as a shank of same, the device as a whole being a hook-bolt. By means of nuts *e*, run on the bolts *d*, the calk-band is fastened on the horseshoe, and the work of connecting said calk-band and horseshoe is of such simple nature as not to require the labor of a skilled workman or the use of tools other than a wrench, and possibly a hammer should it be desirable to expand or contract the aforesaid band. In case of uneven wear on the horseshoe leather, rubber, felt, or other suitable material may be employed between the calk-band and said horseshoe to compensate for said wear and to prevent rattle. The calk-band is also shown provided with inner toe and quarter lugs *f g* to prevent slip of said band when the same is applied to a calkless horseshoe.

When applied to the shoes of a horse, calk-bands similar to what is herein shown and described will prevent the animal from slipping on icy surfaces, and said bands may be readily removed for sharpening of the calks. The calk-bands are to be furnished the trade in sizes for adjustment in sets to match the shoes of any horse as ordinarily shod and thereafter kept on hand ready to be attached to said shoes whenever necessary.

Having thus described my invention, what I claim as new, and desire to secure by Letters Patent, is—

1. A horseshoe attachment consisting of a shoe-shaped band having depending calks rigid therewith and provided at the quarters thereof with clearance-spaces, shoe-engaging clips set in the clearance-spaces of the band, bolts extending from the clips through said band, and nuts run on the bolts.

2. A horseshoe attachment consisting of a shoe-shaped band having depending calks rigid therewith and provided with shoe-opposing inner toe and quarter lugs, shoe-engaging clips set in clearance-spaces in the quarters of the band, bolts extending from the clips through said band, and nuts run on the bolts.

3. A horseshoe attachment consisting of a shoe-shaped band having depending toe and heel calks rigid therewith and recessed to clear blunt toe and heel calks of the horseshoe, clips engageable with said horseshoe and clearance-spaces in the band, bolts extending from the clips through said band, and nuts run on the bolts.

In testimony that I claim the foregoing I have hereunto set my hand, at Lexington, in the county of Fayette and State of Kentucky, in the presence of two witnesses.

CHARLES R. FLEISCHMANN.

Witnesses:
    STANDISH L. STILES,
    ALFRED F. THOMPSON.